UNITED STATES PATENT OFFICE.

JOHN H. SMITH, OF BOIS-COLOMBES, FRANCE.

PROCESS FOR SENSITIZING DYESTUFFS EMPLOYED IN PHOTOGRAPHY.

1,089,594. Specification of Letters Patent. Patented Mar. 10, 1914.

No Drawing. Application filed February 18, 1910. Serial No. 544,717.

*To all whom it may concern:*

Be it known that I, JOHN H. SMITH, a citizen of the Republic of France, residing at Bois-Colombes, France, have invented new and useful Improvements in Processes for Sensitizing Dyestuffs Employed in Photography, of which the following is a specification.

In connection with the bleach-out process of color photography it has been the aim of investigators to discover more energetic sensitizers for the bleach-out dyes than those already employed, both with the view to shortening the duration of printing and with rendering available bleach-out dyes of a somewhat "faster" or more permanent nature under the action of light in order that the finished prints may be of a more permanent character after the sensitizers have been removed.

The object of the present invention is to provide a sensitizer for the bleach-out dyes used in color photography which will be more powerful than those heretofore in use, which will constitute a more energetic sensitizer for bringing about a more rapid development of prints and will furnish prints of a more permanent character.

As the result of extensive experiments, I have discovered that thiosinamin or allyl-sulphourea is a much more energetic sensitizer than any of those hitherto used or known, it having for some dyes a sensitizing action twenty times greater than that of anethol, the sensitizer which has heretofore been most used and recommended as yielding the best results as a sensitizer for bleach-out dyes.

In addition to the powerful action of this sensitizer, thiosinamin possesses the further advantages of being almost odorless and amenable to employment in aqueous as well as in alcoholic solutions. Thiosinamin may either be added directly to the photographic emulsion or it may be brought into combination with sensitive dyes by a subsequent process, such as the bathing process.

I have also found that a very large number of dyes are rendered more sensitive to light by the addition of thiosinamin, for instance, methylene blue, Victoria blue, erythrosin and eosin. Thiosinamin also possesses the advantage, that it may be employed alone or in combination with other sensitizers, for instance, it may be added to dye sensitizers for silver haloids and is capable under suitable conditions of increasing the sensitiveness thereof, two instances of this last mentioned advantage being the addition of thiosinamin to erythrosin and eosin above mentioned.

In using thiosinamin in bleach out emulsions, seven parts thiosinamin are employed to one part of the dye, and in silver haloid solutions, equal quantities are used. 8% solutions of the thiosinamin are made use of in preparing the sensitizer in the above proportions.

The term "sensitiveness" as used in this specification is meant primarily to indicate the speed with which the dyes fade, or the impulse which induces the fading of the dyes.

Having fully and clearly set forth my invention, I claim:

1. A process for increasing the sensitiveness to the action of light of dyestuffs used in photography, consisting in introducing thiosinamin into the photographic product containing the light sensitive dye.

2. A process for increasing the sensitiveness to the action of light dyestuffs used in photography, consisting in incorporating thiosinamin in the finished photographic product containing the light sensitive dye and silver haloid.

The foregoing specification signed at Paris, France, this third day of February, 1910.

DR. JOHN H. SMITH.

In presence of—
 H. C. COXE,
 JACK H. BAKER.